United States Patent [19]

Boyer et al.

[11] Patent Number: 4,524,663
[45] Date of Patent: Jun. 25, 1985

[54] POWER HACKSAW

[76] Inventors: Ray E. Boyer; Harriet S. Boyer, both of P.O. Box 18451, Rte. 2-30, Massena, N.Y. 13662

[21] Appl. No.: 533,922

[22] Filed: Sep. 20, 1983

[51] Int. Cl.³ .............................................. B27B 11/00
[52] U.S. Cl. ........................................ 83/762; 83/824; 269/87.2
[58] Field of Search ................................. 30/392–394, 30/272 A, 500; 269/87.2; 83/463, 753, 758, 762, 825, 824

[56] References Cited

U.S. PATENT DOCUMENTS

| 43,561 | 7/1864 | Berry | 83/762 |
| 548,453 | 10/1895 | Otis | 83/463 |
| 573,028 | 12/1896 | McBeth | 83/824 |
| 4,377,909 | 3/1983 | Keener | 30/500 |

FOREIGN PATENT DOCUMENTS 476370 8/1951 Canada ................................ 83/758

Primary Examiner—Douglas D. Watts
Attorney, Agent, or Firm—Morgan, Finnegan, Pine, Foley & Lee

[57] ABSTRACT

In a power actuated hacksaw, a blade guide having a bearing block and roller assembly is disposed within a raceway in order to align the hacksaw blade. The blade guide is mounted on a vise which securely holds a workpiece in place while it is being cut. The hacksaw blade is held by a frame which reciprocates in response to the rotation of a wheel. The wheel may be rotated by either a motor or an electric drill.

12 Claims, 6 Drawing Figures

POWER HACKSAW

BACKGROUND OF THE INVENTION

The present invention relates generally to saws and more specifically to a power actuated hacksaw.

The most common power actuated hacksaw presently available to consumers is an electrically operated sabre saw having a hacksaw blade attached thereto. The sabre saw is notorious for making uneven cuts in a workpiece and it is virtually impossible to make a straight and even cut in the workpiece when the sabre saw is hand held.

In industrial applications there are numerous power actuated band saws which have roller type blade guiding devices for making straight and even cuts in a workpiece. For example, U.S. Pat. No. 1,060,157, entitled "Saw", by A. Brazier, discloses a band saw having rollers which act as guides. Brazier's saw is useful in lumber mill type operations and the purpose of his roller guides is to prevent the band saw from sagging across its relatively long length. U.S. Pat. No. 1,264,339, entitled "Band-Saw Machine" by Martin G. Shinn discloses a complex table type of band saw having an endless blade which is guided by rollers. The teachings of the above referenced patents describe large, complex and costly saws which are not particularly suitable for use by the typical homeowner.

SUMMARY OF THE INVENTION

The apparatus of the present invention provides a power actuated hacksaw having a roller guided blade. The hacksaw blade is held in a frame which is reciprocated in a substantially linear direction by a motor coupled to a wheel. The blade may also be actuated by operation of a variable speed drill. The motor, wheel, and frame are all coupled to a base which also preferably supports the workpiece to be cut. The blade guide includes a raceway coupled to the base and a bearing block with a pair of rollers attached thereto disposed within the raceway. The blade is disposed beneath the bearing block and between the pair of rollers, and as the blade reciprocates the bearing block and roller assembly is displaced vertically within the raceway. The power actuated hacksaw also preferably includes a vise which holds the workpiece in place and provides a mounting surface for the raceway of the blade guide.

DETAILED DESCRIPTION OF THE PREFERRED EMBODIMENT

Figure 1:
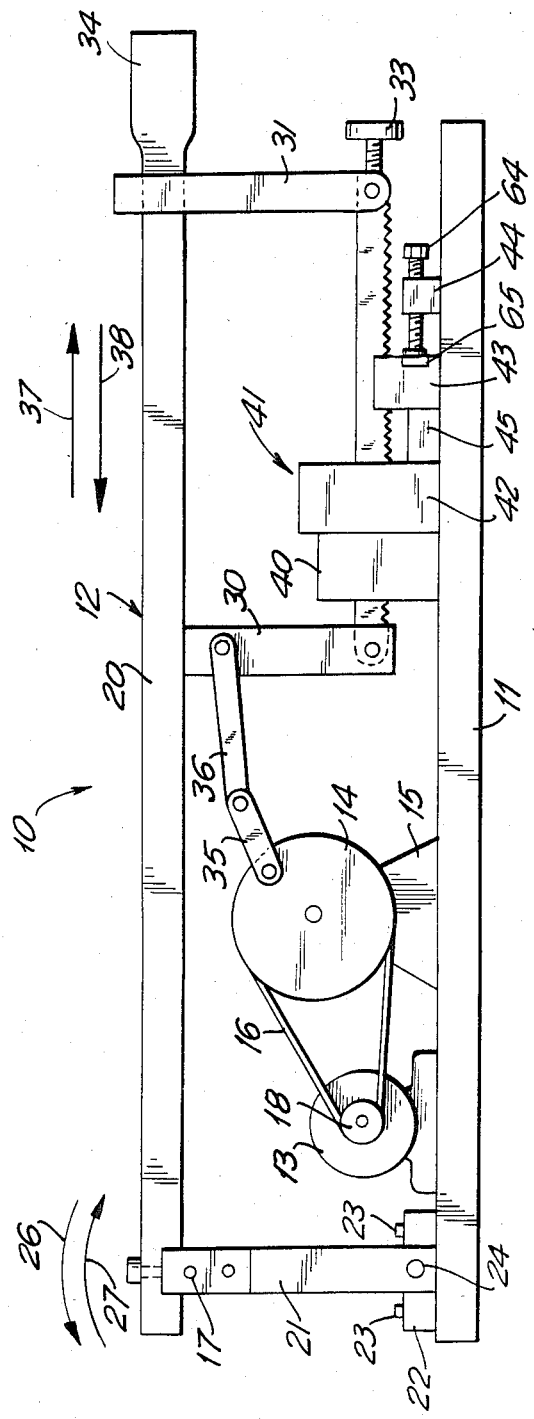
FIG. 1 is a side view of the power hacksaw of the present invention.

Referring now to FIG. 1, a side view of the power actuated hacksaw 10 of the present invention is provided. The power actuated hacksaw 10 includes a base 11 which supports a frame 12, a motor 13, and a wheel 14. The wheel 14 is rotatably mounted with ball bearings on a support 15 and coupled to the motor 13 via a pulley 18 and a belt 16.

The frame 12 includes a top member 20 preferably fabricated from two aluminum angles with filler therebetween. The top member 20 is pivotally connected to an upright 21 by ball bearings 17, and the upright is in turn pivotally connected to the base 11 by an anchor plate 22, bolts 23, and a roller bearing 24. The pivotal motion of the upright 21 is indicated by arrows 26,27. The frame 12 further includes arm members 30,31 which hold hacksaw blade 32. Preferably adjustment means such as a hand screw 33 is connectable to hacksaw blade 32 for changing the blade and for applying tension to the hacksaw blade 32. It is preferable that frame 12 include a handle 34 for facilitating the raising of frame 12 and the replacing of hacksaw blade 32.

The frame 12 is coupled to the wheel 14 by linkage rods 35,36 which are pivotally connected to each other. In addition, rod 35 is pivotally connected to wheel 14 and rod 36 is pivotally connected to arm member 30. As wheel 14 rotates linkage rods 35,36 impart a substantially linear reciprocating motion to the frame 12 and the hacksaw blade 32. The substantially linear reciprocating motion is indicated by the arrows 37,38.

A protective cover 40 for a blade guide, hereinafter described in greater detail, is disposed on the base 11 in close proximity to a vise 41 which is comprised of three members 42,43,44 and a handscrew 64. The vise 41 holds a workpiece 45 securely in place while it is being cut by the hacksaw blade 32.

The blade guide assembly of the invention is protected by the cover 40 and includes a support member 41 that is affixed to frame 11. As illustrated, vise 41 may comprise a pair of stationary end portions 42 and 44 which are affixed to the base 11 and a clamping portion 43 that is movable towards and away from end portion 42 for securing and releasing the workpiece 45 to be cut. Movement of clamping portion 43 may be effected by screw means 64 that is threaded through end portion 44 and cooperates with clamping portion 43.

Figure 2:
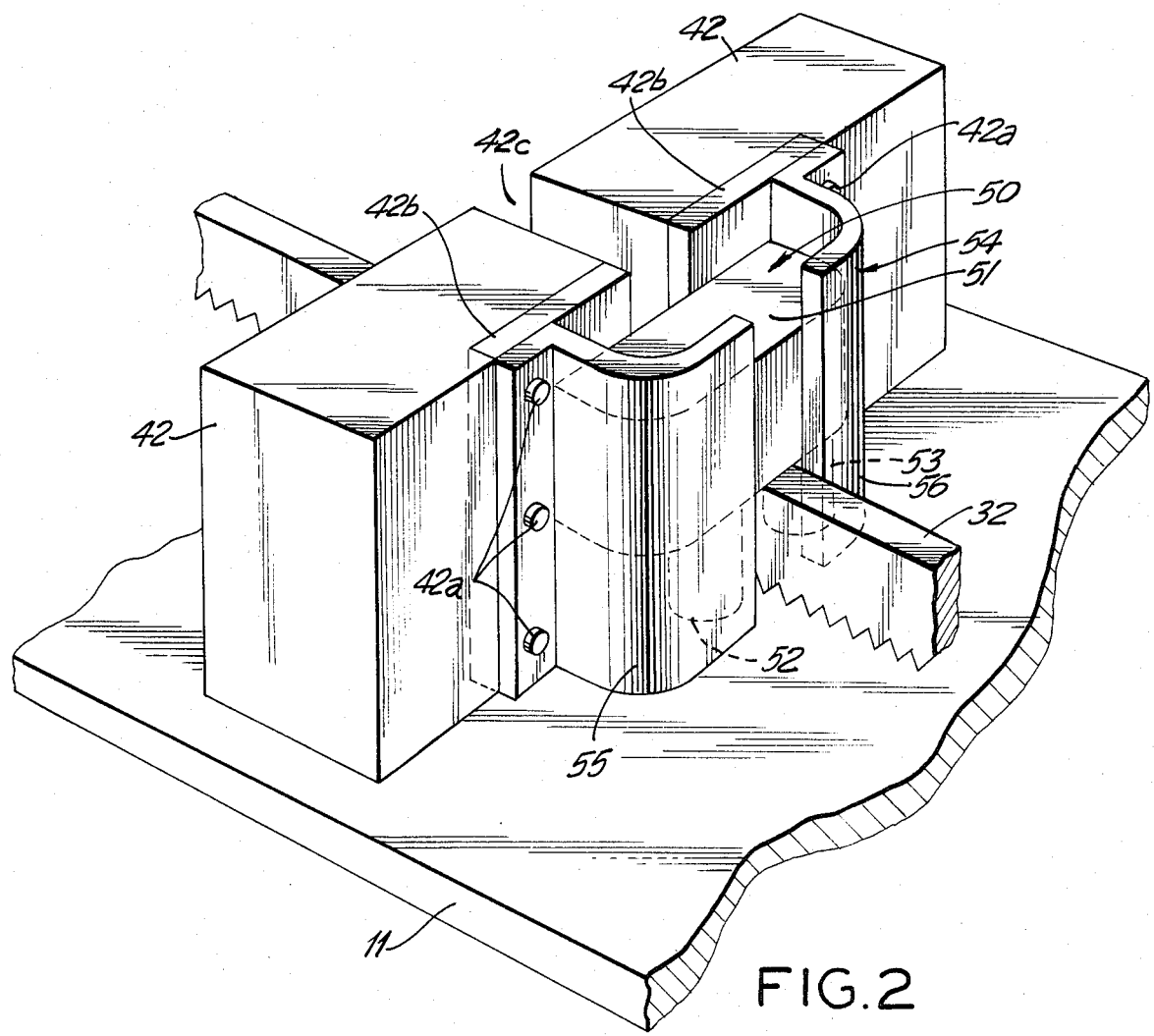
FIG. 2 is an isometric view of a blade guide having the block and roller assembly disposed within a raceway.

Referring now to FIG. 2, a partial isometric view of the blade guide 50 is provided. The blade guide 50 is comprised of a bearing block 51 and rollers 52,53 that are affixed to block 51. Block 51 and rollers 52, 53 are movably disposed within a raceway 54 having spaced apart support sections 55,56. The raceway sections 55,56 are secured to the first member 42 of the vise 41 by a plurality of bolts 42a or other suitable fasteners. The member 42 is preferably fabricated from wood or aluminum and includes an inlaid steel wearing surface 42b which interfaces with the bearing block 51. The member 42 also includes a narrow aperture 42c for the hacksaw blade 32.

Figure 3:
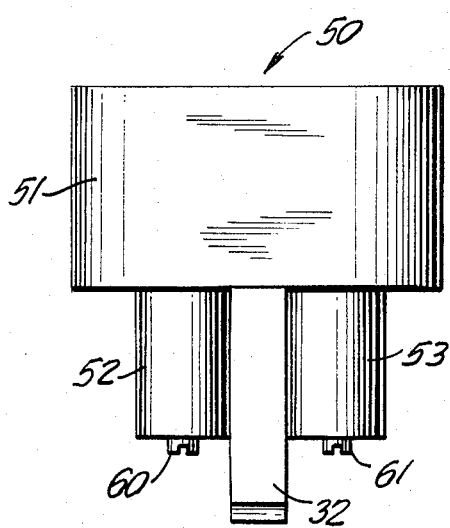
FIGS. 3 and 4 are front and side views, respectively, of the block and roller assembly of FIG. 2.
Figure 4:
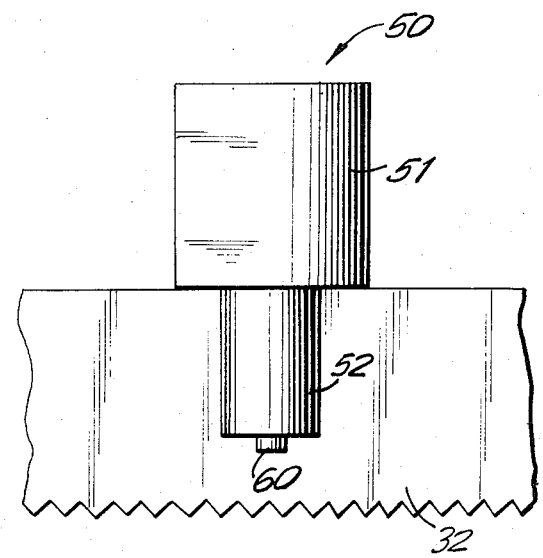

Referring now to FIGS. 3 and 4, front and side views, respectively, of the blade guide 50 are provided. The rollers 52,53 are rotatably mounted to the bearing block 51 by bolts 60,61. As shown, bearing block 51 is disposed on top of the hacksaw blade 32 and exerts a downward force thereon. The hacksaw blade 32 is disposed between the rollers 52,53 which help to maintain the alignment of the hacksaw blade 32.

Figure 5:
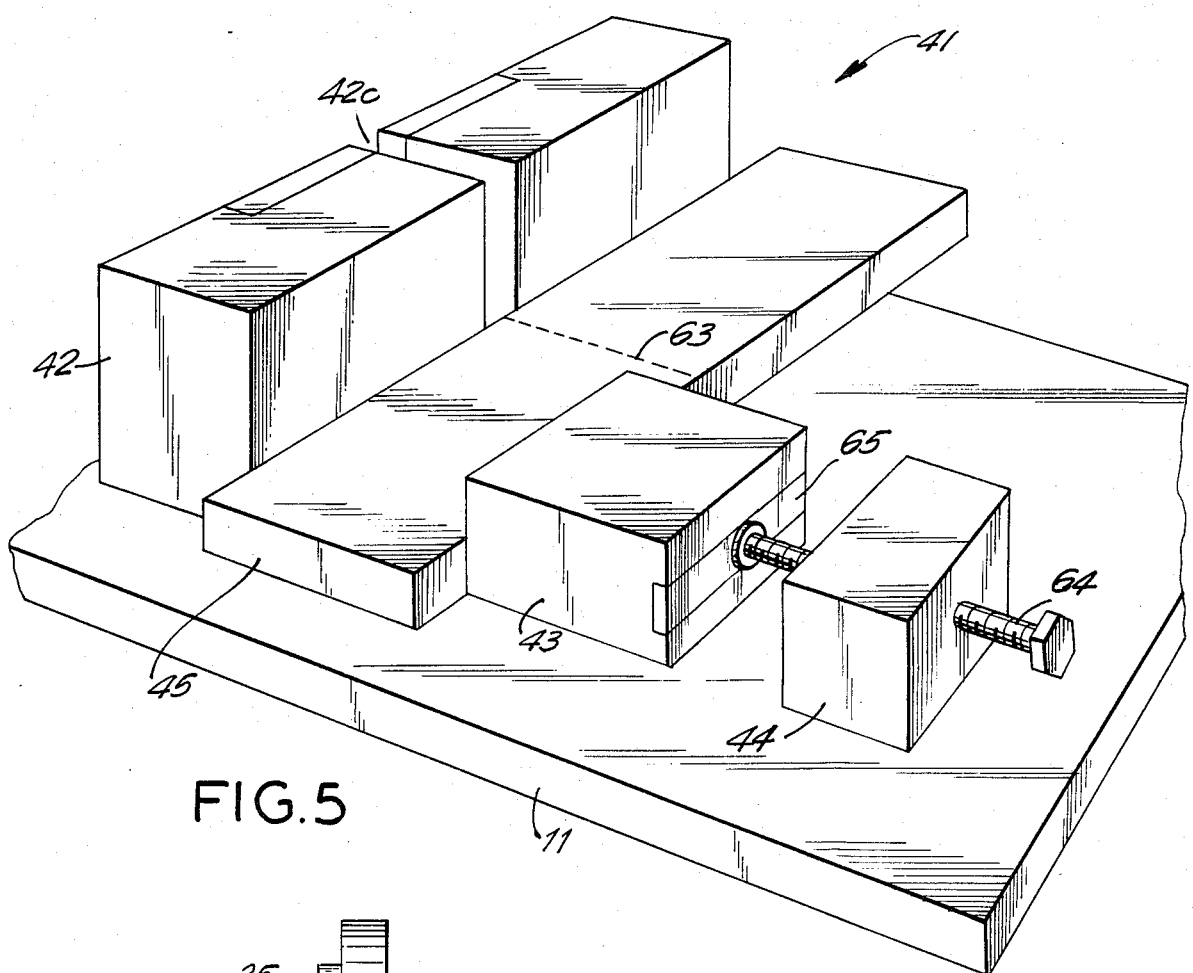
FIG. 5 is an enlarged partial isometric view of the vise shown in FIG. 1.

Referring now to FIG. 5, a partial isometric view illustrates the vise 41. The vise 41 is comprised of the members 42,43,44 which are all disposed on the base 11. The workpiece 45 is securely held in place between the members 42,43 in order that the hacksaw blade 32 (not shown), which would be received through the aperture 42c in member 42, could cut the workpiece 45 along the scored line 63. The member 43 is adjusted relative to member 42 by a threaded hex headed bolt 64. The member 43 is preferably fabricated from aluminum and includes an inlaid steel wearing surface 65 which provides a durable surface for the threaded bolt 64. The bolt 64 is threaded through a suitably tapped hole in member 44 which is affixed to the base 11. The bolt 64 may be rotated by a ratchet wrench or other suitable device, thereby displacing member 43 relative to member 42 which is affixed to the base 11.

Figure 6:
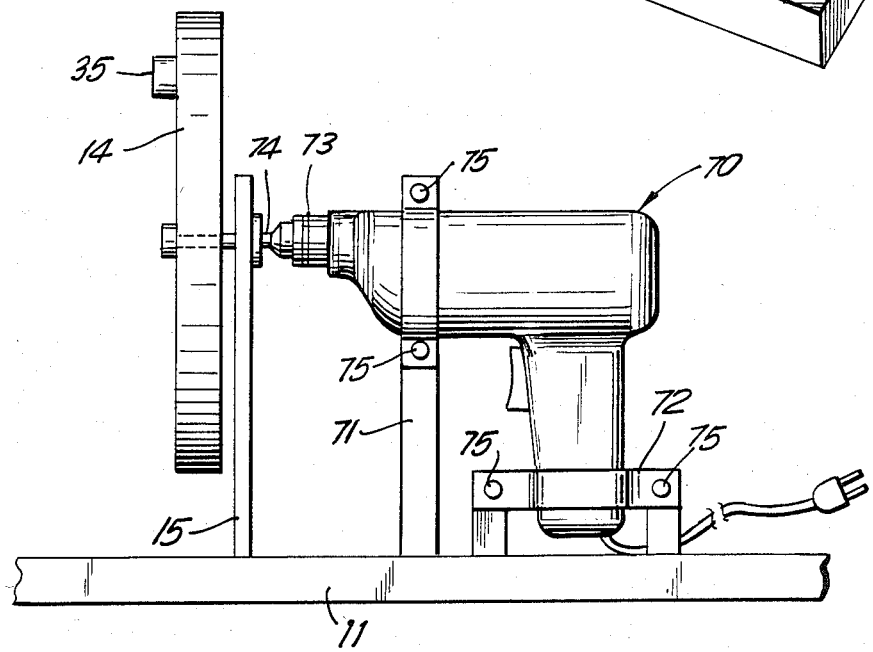
FIG. 6 is an illustration of an electrical hand drill which may be used in lieu of a motor to actuate the apparatus of FIG. 1.

Referring now to FIG. 6, an illustration of an electrical hand drill 70 which may be used in lieu of the motor 13, the pulley 18, and the belt 16, is provided. The electric drill 70 is coupled to the base 11 by clamps 71,72 having bolts 75 or other suitable fasteners. The chuck 73 of the electric drill 70 is connected to a shaft 74 of the wheel 14 which is rotatably mounted in the support 15. The electric drill 70 is preferably of the variable speed type, in order to provide the wheel 14 and the linkage rod 35 which is pivotally connected thereto with controlled rotation.

In operation the apparatus of the present invention imparts a substantially reciprocating motion to the hacksaw blade 32 in order to cut the workpiece 45. The reciprocating motion is imparted to the frame 20 by the rotary motion of wheel 14 and the linkage rods 35,36. The wheel 14 may be rotated by the motor 13 shown in FIG. 1 or the electric drill 70 shown in FIG. 6.

The workpiece 45 is placed in the cutting position between members 42 and 43. The hand screw 64 is then tightened, in order to secure the workpiece tightly between the members 42,43. The motor 13 is turned on, thereby actuating the hacksaw blade 32 into a substantially reciprocating motion which places a cut into workpiece 45.

Referring again to FIG. 2, it can be appreciated that as the hacksaw blade 32 is reciprocating, the bearing block 51 of blade guide 50 is exerting a downward force on the saw blade 32. As the saw blade 32 reciprocates, the bearing block 51 is displaced vertically within the raceway 54 and rollers 52,53 rotate. The action of the rollers 52,53 as well as bearing block 51 within the raceway 54 provide alignment for the saw blade 32 which enables it to make a straight and even cut in the workpiece 45.

If the hacksaw blade 32 requires replacement, the hacksaw blade 32 may be lifted away from the cutting position with the handle 34. The hand screw 33 may then be loosened and the hacksaw blade 32 may be removed. A new blade can then be inserted and the hand screw 33 tightened to the desired tension.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A power actuated saw comprising:
   (a) a base;
   (b) means for holding a saw blade;
   (c) drive means coupled to said holding means for providing a substantially reciprocating motion to said holding means and the saw blade;
   (d) guide means for aligning and enhancing the cutting force of the saw blade including;
      (i) a vertical raceway, disposed adjacent to said base, said raceway having an enclosure and having a slot for receiving the saw blade;
      (ii) a block member disposed in the enclosure of said raceway for contacting the top of the blade so as to exert a downward force on the blade towards the base, said block member being movably disposed in only a vertical direction within said enclosure of said raceway; and
      (iii) a pair of vertical roller members coupled to the bottom of said block member for exerting horizontal forces on the saw blade and aligning the blade in the direction of reciprocation.

2. An apparatus according to claim 1 which further includes a vise coupled to said base for holding a workpiece.

3. An apparatus according to claim 2 wherein said vise includes a first member affixed to said base and having an aperture for said saw blade, and a second member adjustably coupled to said base for holding the workpiece between said first and second members of the vise.

4. An apparatus according to claim 3 wherein said raceway is fixedly attached to the first member of said vise.

5. An apparatus according to claim 4 wherein said drive means includes a wheel and linkage coupled to said holding means.

6. An apparatus according to claim 5 wherein said holding means includes a hand screw for adjusting the tension of the saw blade.

7. An apparatus according to claim 6 wherein said vise includes a third member adapted to receive a threaded hex headed bolt which controls the adjustment of the second member of said vise.

8. An apparatus according to claim 7 wherein said holding means includes an arm pivotally coupled to said base and responsive to said drive means.

9. An apparatus according to claim 8 wherein said holding means further includes a handle.

10. An apparatus according to claim 9 wherein said drive means includes an electric motor and belt coupled to said wheel.

11. An apparatus according to claim 9 wherein said drive means includes an electric drill coupled to said wheel.

12. An apparatus according to claim 1 wherein said drive means includes an electric drill.

* * * * *